US007106170B2

(12) United States Patent
Wang

(10) Patent No.: US 7,106,170 B2
(45) Date of Patent: Sep. 12, 2006

(54) GARAGE DOOR OPENER

(75) Inventor: Guodon Wang, Suzhou (CN)

(73) Assignee: Positec Power Tools (Suzhou) Co., Ltd., Suzhou (CN)

(*) Notice: Subject to any disclaimer, the term of this patent is extended or adjusted under 35 U.S.C. 154(b) by 230 days.

(21) Appl. No.: 10/672,812

(22) Filed: Sep. 26, 2003

(65) Prior Publication Data

US 2004/0119581 A1 Jun. 24, 2004

(30) Foreign Application Priority Data

Sep. 30, 2002 (CN) ................................ 02 1 38400

(51) Int. Cl.

| | |
|---|---|
| ***B60R 25/00*** | (2006.01) |
| ***G05B 19/00*** | (2006.01) |
| ***G06F 7/00*** | (2006.01) |
| ***G08B 29/00*** | (2006.01) |
| ***H04B 1/00*** | (2006.01) |

(52) U.S. Cl. ........................ 340/5.71; 340/5.7; 340/5.8

(58) Field of Classification Search ............... 340/5.71, 340/5.7, 5.8, 5.2, 5.6; 455/419, 410, 343.3, 455/127, 550.1, 572; 70/256; 341/176

See application file for complete search history.

(56) References Cited

U.S. PATENT DOCUMENTS

| | | | | |
|---|---|---|---|---|
| 4,750,118 | A | 6/1988 | Heischel et al. | 364/400 |
| 5,473,318 | A * | 12/1995 | Martel | 340/5.23 |
| 5,650,774 | A * | 7/1997 | Drori | 340/5.22 |
| 5,933,090 | A * | 8/1999 | Christenson | 340/825.69 |
| 6,026,165 | A | 2/2000 | Marino et al. | |
| RE36,703 | E | 5/2000 | Heischel et al. | 700/90 |
| 6,728,351 | B1 * | 4/2004 | Ahlstrom et al. | 379/102.06 |
| 6,903,650 | B1 * | 6/2005 | Murray | 340/5.23 |
| 6,941,136 | B1 * | 9/2005 | Study et al. | 455/419 |
| 2002/0067826 | A1 | 6/2002 | King | |

FOREIGN PATENT DOCUMENTS

| | | |
|---|---|---|
| DE | 101 06 956 | 2/2001 |
| WO | WO 02/075669 | 9/2002 |

* cited by examiner

*Primary Examiner*—Wendy R. Garber
*Assistant Examiner*—Nam Nguyen
(74) *Attorney, Agent, or Firm*—Daniel P. McCarthy

(57) ABSTRACT

A garage door opener comprises at least two radio frequency transmitters, a radio frequency receiver, at least two memories, and a processor. Each memory corresponds to one radio frequency transmitter and stores a code of a corresponding radio frequency transmitter. The radio frequency transmitter is connected to the processor by electrical connectors. It is impossible to mis-study to the other radio frequency transmitter because the processor in the host computer has no program mode. Since each memory corresponds to one radio frequency transmitter, when one radio frequency transmitter is lost, a corresponding memory is eliminated to make the lost radio frequency transmitter disuse.

5 Claims, 1 Drawing Sheet

GARAGE DOOR OPENER

FIELD OF THE INVENTION

The present invention relates to a garage door opener.

BACKGROUND OF THE INVENTION

In the existing arts, U.S. Pat. No. RE36703E discloses a coding system for multiple transmitters and a single receiver for a garage door opener, and U.S. Pat. No. 4,750,118 also discloses such a coding system prior to the former. For controlling the position of the barrier (door), a garage door opener comprises components below. At least one radio frequency transmitter has a non-user changeable code for radio frequency transmitting a radio frequency transmission. A radio frequency receiver is adapted to receive the first-mentioned radio frequency transmission from the first-mentioned radio frequency transmitter and to receive a second radio frequency transmission from a second radio frequency transmitter having a second non-user changeable code, different from the first non-user changeable code. A program mode designator is adapted for designating a program mode. A memory comprises a plurality of storage location. A processor has a processor controlled code location pointer and is responsive to a program mode designation by the program mode designator and the reception by the radio frequency receiver of the first-mentioned radio frequency transmission for storing a first stored code corresponding to the first-mentioned radio frequency transmitter in one of the plurality of storage locations derived from the processor controlled code location pointer. The processor is responsive to the program mode designation by the program mode designator and the reception by the receiver of the second radio frequency transmission for storing a second stored code corresponding to the second radio frequency transmitter in another of the plurality of storage locations derived from the processor controlled code location pointer. The processor is responsive to an operate mode and the reception of the first-mentioned radio frequency transmission after the storage of the first stored code for moving the barrier and responsive to the operate mode and to the reception of the second radio frequency transmission after the storage of the first and the second stored codes for moving the barrier. Because the garage door opener puts the codes in one memory, when the radio frequency transmitter is lost and needs to be replaced by a new one, the program mode designator designates a program mode and each radio frequency transmitter transmits a program signal to make the memory memorially program. But under the program mode, a code signal transmitted by an unlawful radio frequency transmitter may also be memorially programmed by the memory, and so the unlawful radio transmitter can open the garage door so that the garage door opener is unsafe in use.

SUMMARY OF THE INVENTION

An object of the present invention is to provide a garage door opener which can disuse the code signal of the radio frequency transmitter stored in the memory while does not adversely affect the use of the other radio frequency transmitters.

The technology of the present invention: a garage door opener comprises:

at least two radio frequency transmitters, said radio frequency transmitter producing a non-user changeable radio frequency code signal;

a radio frequency receiver, the radio frequency receiver being adapted to receive the code signals from the at least two radio frequency transmitters, codes produced by a first radio frequency transmitter and a second radio frequency transmitter being different;

at least two memories, each memory corresponding to one radio frequency transmitter and storing a code of a corresponding radio frequency transmitter, each memory connected to a processor;

the processor, when the radio frequency receiver receives the code signal from the radio frequency transmitter and sends it to the processor, the processor decoding the code signal from the radio frequency receiver and comparing the decoded codes with that stored in each memory, and once the codes are identical after comparing, the processor sending a signal to control an operation of the garage door.

The advantages of the present invention relative to the existing arts: For improving the safe performance of the present system, the processor in the host computer has no program mode and only responds to the operating mode to avoid the possibility for it to mis-learn from the other radio frequency transmitter. Multiple memories are provided and each memory corresponds to one radio frequency transmitter, so when one radio frequency transmitter is lost, its corresponding memory is eliminated so that the processor can not read the code stored in the corresponding memory and the radio frequency transmitter is disused while ensuring the other radio frequency transmitters to be normally used.

BRIEF DESCRIPTION OF THE DRAWINGS

FIG. 1 is a block diagram of the electrical circuitry of the present invention; wherein

Figure 1:
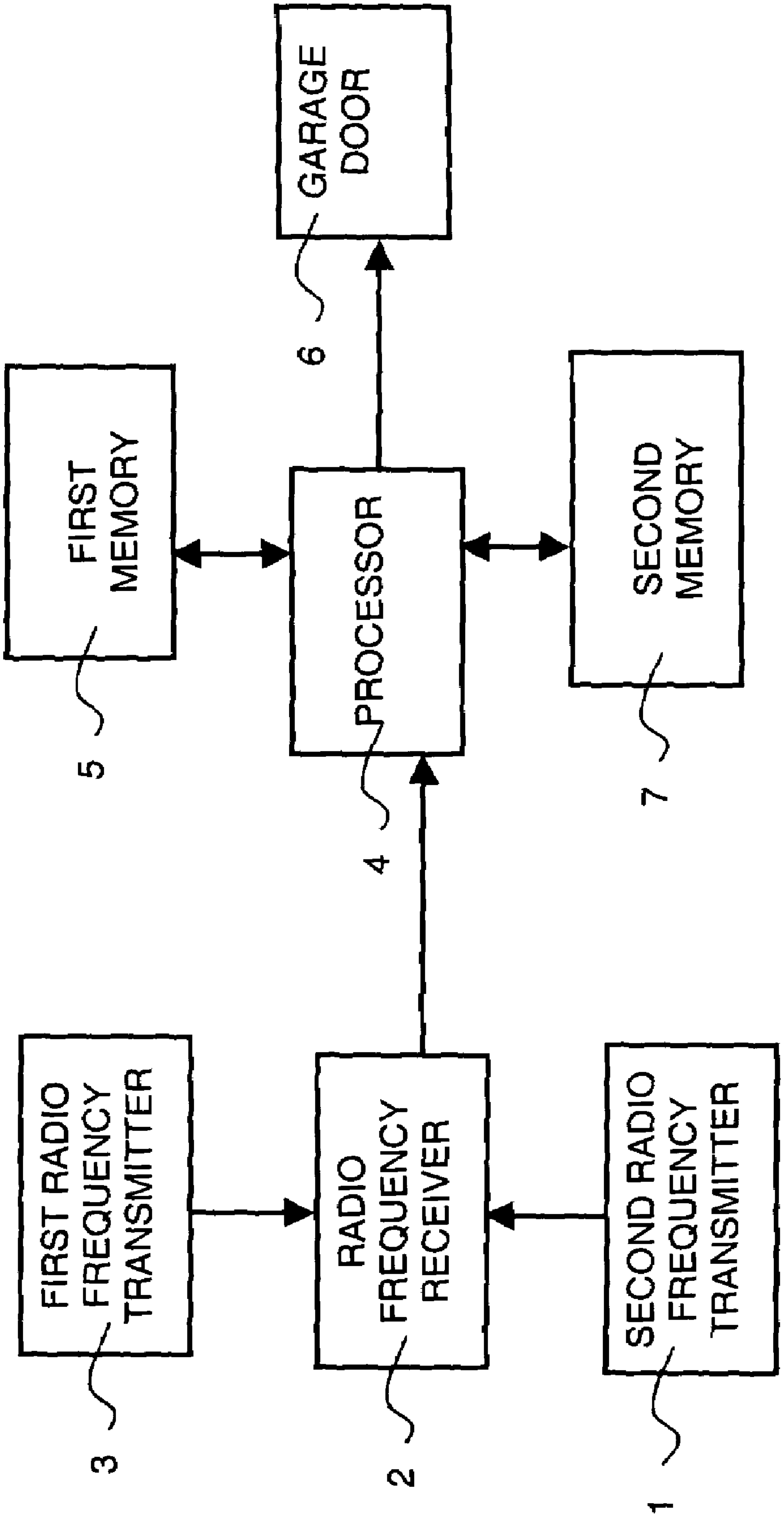

[1] second radio frequency transmitter; [2] radio frequency receiver; [3] first radio frequency transmitter; [4] processor; [5] first memory; [6] garage door; [7] second memory.

DETAILED DESCRIPTION OF THE INVENTION

Referring to the drawings, a garage door opener, comprises:

At least two radio frequency transmitters, i.e. two, or three, or four, or five, or six radio frequency transmitters. FIG. 1 shows two radio frequency transmitters, one is a first radio frequency transmitter 3, and the other is a second radio frequency transmitter 1. The two radio frequency transmitters 3, 1 both can produce a non-user changeable radio frequency code signal;

A radio frequency receiver 2, the radio frequency receiver 2 is adapted to receive the code signal from the first and second radio frequency transmitters 3, 1. The codes produced by the first and second transmitters 3, 1 is different.

At least two memories, each memory corresponds to one radio frequency transmitter and stores a code of a corresponding radio frequency transmitter. Each memory is connected to the process by connectors. Since there are two radio frequency transmitters shown in the drawing, there are two corresponding memories which are the first memory 5 and the second memory 7. The two memories 5, 7 are both inserted on the printed circuit board by the connectors and connected to the processor. The first memory 5 is adapted to store the code signal from the first radio frequency transmitter 3. The second memory 7 is adapted to store the code signal from the second radio frequency transmitter 1.

A processor 4, when the radio frequency receiver receives the code signal from the radio frequency transmitter and sends it to the processor 4, then the processor 4 decodes the code signal from the radio frequency receiver and compares the decoded codes with those stored in each memory, and once they are identical after comparing, the processor 4 sends a signal to control the operation of the garage door.

When one of the radio frequency transmitters is lost, only the corresponding memory which stores the code of the lost the transmitter is eliminated, then the lost transmitter is disuse. Therefore, the garage door opener is reliable in use.

What is claimed is:

1. A garage door opener comprising;

a plurality of radio frequency transmitters, each radio frequency transmitter capable of producing a non-user changeable radio frequency code signal where the radio frequency code signal from each transmitter is different;

a radio frequency receiver adapted to receive radio frequency code signals from radio frequency transmitters;

a processor for processing radio frequency code signals received by the receiver;

a plurality of memories where there is a memory corresponding to each one of the radio frequency transmitters, each memory storing a code corresponding with the radio frequency code signal of each of the radio frequency transmitters;

control structure for controlling operation of the garage door; the processing by the processor comprising;

comparing a received radio frequency code with the code in each of the memories, and signaling the control structure to control operation of the garage door when the received radio frequency code is associated with the code in any one of the memories;

wherein each of the memories is removable independently of the other memories; and wherein each of the memories is replaceable with another memory with a code in the memory associated with the different radio frequency code signal.

2. A garage door opener of claim 1 wherein the code in each of the memories is capable of being selectively disabled independently of the other memories.

3. A garage door opener comprising:

at least two radio frequency transmitters including a first radio frequency transmitter and a second radio frequency transmitter, each radio frequency transmitter capable of producing a non-user changeable radio frequency code signal where codes produced by the first radio frequency transmitter and the second radio frequency transmitter are different;

a radio frequency receiver adapted to receive the radio frequency code signals from the at least two radio frequency transmitters;

a processor; and at least two memories, each memory corresponding to one of the at least two radio frequency transmitters and storing the code of the one of the at least two radio frequency transmitters, each memory being connected to the processor such that when the radio frequency receiver receives the code signal from a radio frequency transmitter it sends the radio frequency receiver, and the processor decodes the code signal and compares the decoded codes with the codes stored in each memory so that once matching codes are identified, the processor sends a signal to control operation of the garage door;

wherein each memory is removable such that when the first radio frequency transmitter is lost, the memory corresponding to the first radio frequency transmitter is removed; and wherein the codes in each of the different memories are different.

4. A garage door opener as claimed in claim 3 wherein the processor has no program mode.

5. A garage door opener as claimed in claim 3 wherein the code stored in each memory is capable of selective disablement.

* * * * *